(12) United States Patent
Falatok et al.

(10) Patent No.: US 6,484,766 B1
(45) Date of Patent: Nov. 26, 2002

(54) STUMP GRINDING APPARATUS HAVING IMPROVED CUTTER TOOL

(75) Inventors: Daniel R. Falatok, Moore, SC (US); John T. Bird, Greenville, SC (US)

(73) Assignee: BB&F Enterprises, LLC, Spartanburg, SC (US)

( * ) Notice: Subject to any disclaimer, the term of this patent is extended or adjusted under 35 U.S.C. 154(b) by 0 days.

(21) Appl. No.: 09/940,108

(22) Filed: Aug. 27, 2001

(51) Int. Cl.[7] ............................................... A01G 23/06
(52) U.S. Cl. ........................ 144/24.12; 37/302; 144/218; 144/235; 144/241; 144/334; 241/291; 299/103
(58) Field of Search ................................. 144/24.12, 218, 144/241, 334, 235, 236; 241/291; 299/79.1, 102, 103, 108, 112; 37/302; 407/46, 59, 113, 115

(56) References Cited

U.S. PATENT DOCUMENTS

| | | | |
|---|---|---|---|
| 2,686,663 A | * 8/1954 | Bruestle | 299/102 |
| 2,743,917 A | * 5/1956 | Krekeler et al. | 299/103 |
| 2,798,715 A | * 9/1957 | Brown | |
| 4,759,394 A | * 7/1988 | Clemenson | 144/241 |
| 4,974,649 A | * 12/1990 | Manning | 144/241 |
| 4,998,574 A | * 3/1991 | Beach et al. | 144/241 |
| 5,005,622 A | * 4/1991 | Beach | 144/241 |
| 5,279,345 A | * 1/1994 | LeMaux et al. | 144/241 |
| 5,365,986 A | 11/1994 | Hooser | |
| 5,435,359 A | 7/1995 | Craft | |
| 5,497,815 A | 3/1996 | Bowling | |
| 5,499,771 A | 3/1996 | Esposito et al. | |
| 5,641,129 A | 6/1997 | Esposito et al. | |
| 5,743,314 A | 4/1998 | Puch | |
| 5,743,315 A | 4/1998 | Esposito et al. | |
| 5,819,827 A | * 10/1998 | Leonardi | 144/241 |
| 5,996,657 A | 12/1999 | Riesselman | |
| 6,003,570 A | 12/1999 | Falatok et al. | |
| 6,024,143 A | 2/2000 | Ritchey | |
| 6,047,749 A | 4/2000 | Lamb | |

* cited by examiner

*Primary Examiner*—W. Donald Bray
(74) *Attorney, Agent, or Firm*—Nelson Mullins Riley & Scarborough (57) ABSTRACT

A stump grinding wheel includes a wheel member having a plurality of receiving brackets. Each receiving bracket includes a cutting tool channel. A cutting tool is received in each of cutting tool channel. Each cutting tool includes an elongated shaft having a base end and a distal end, and a cutting tip at the distal end. A stop is defined on the elongated shaft between the base end and the distal end and is configured so that it permits gauging of the distance between each receiving bracket and a respective cutting tip.

17 Claims, 8 Drawing Sheets

STUMP GRINDING APPARATUS HAVING IMPROVED CUTTER TOOL

BACKGROUND OF THE INVENTION

The present invention relates generally to stump grinding machines of the type having a grinding wheel located at the distal end of a movable boom. More particularly, the invention relates to improvements in the replaceable cutting tools that are mounted on the machine's grinding wheel.

Stump grinding machines are widely used to remove tree stumps. The stump is removed by a driven grinding wheel located at the distal end of a movable boom. Typically, the grinding wheel is swept back and forth in a generally horizontal plane across the stump. With each sweep the grinding wheel may be lowered or moved forward slightly to remove more of the stump and the final sweeps may be below ground level to ensure elimination of the entire stump. Details regarding the structure and operation of a stump cutter can be found in U.S. Pat. No. 6,003,570, incorporated herein by reference.

The grinding wheel includes a plurality of brackets or other mechanisms for receipt of cutting tools. The cutting tools are mounted to the grinding wheel in pockets or channels formed in the brackets so that the cutting tip portion of the cutting tool extends radially outward from its respective bracket to perform the grinding function. It will be appreciated, however, that these cutting tools must often be replaced due to normal and wear and tear. For example, both the shaft portion of the cutting tool and the cutting tip of the cutting tool (which is typically a carbide tip) may be subject to breakage or wear. In some cases, the manufacturer of the stump grinding machine may configure the grinding wheel and the corresponding brackets to maximize the stump grinding potential of the wheel and extend the life of the cutting tools.

One example of a prior art cutting tool and bracket that is conventional in many respects is shown in FIG. 4 of U.S. Pat. No. 5,279,345, to LeMaux et al. The cutting tool defines a substantially uniform crosssection extending from its base end towards its cutting tip. The cutting tool may include a bend toward the cutting tip end so that the cutting wheel defines a full cut pattern when all of the cutting tools are properly installed. The conventional receiving bracket includes a cutting tool receiving channel that defines a substantially uniform cross-section corresponding to that of the cutting tool's shank. To properly gauge the distance between each cutting tool tip and its corresponding receiving bracket, operators of stump grinding machines utilizing conventional cutting tools and brackets must utilize a separate gauging bar or other measurement device. The measured depth must then be maintained while tightening the receiving bracket on the cutting wheel.

In addition to these conventional cutting tools, several other types of cutting tools exist in the art. In one case, a large cutting tool defines a dimpled portion that engages with a protrusion defined on the corresponding receiving bracket. In another design, the bracket and the cutting tool are simply made of a unitary construction. However, these prior art designs are larger, heavier, and generally more expensive than conventional cutting tools. For example, the dimpled cutting tool requires use of a special corresponding bracket that would not work well, if at all, with any other type of cutting tool.

SUMMARY OF THE INVENTION

The present invention recognizes and addresses the foregoing considerations, and others, of prior art constructions and methods. Accordingly, it is an object of the present invention to provide a novel stump grinding machine.

It is a further object of the present invention to provide a stump grinding machine having improved cutter tools mounted to the cutting wheel.

It is a more particular object of the present invention to provide a novel stump cutter tool which facilitates ease of mounting to the grinding wheel.

Some of these objects are achieved by a stump grinding wheel including a wheel member having a plurality of receiving brackets. Each bracket includes a cutting tool channel for receipt of a respective cutting tool. Each cutting tool includes an elongated shaft having a base end and a distal end, and a cutting tip at the distal end. A stop is defined on the elongate shaft between the base end and the distal end and is configured so that it permits gauging of the distance between the receiving bracket and the cutting tip.

In one exemplary embodiment, the stop is defined on one surface of the elongated shaft. The elongate shaft may include a first side surface, a second side surface, a front surface, and a rear surface. In one preferred embodiment, the stop is defined on the front surface. At least a portion of the front and rear surfaces may be parallel, and at least a portion of the first side surface and second side surface may also be parallel. The cutting tip may be defined on the front surface and it can be angled with respect to a longitudinal axis of the cutting tool. The elongate shaft may define a bend between its base end and its distal end, and the stop may be defined between the bend and the distal end.

Preferably, the wheel member rotates about a wheel shaft and each receiving bracket is configured on the wheel member so that the base ends of the cutting tools are closer to the cutting wheel shaft than the distal ends. In one embodiment, the bracket channel defines a longitudinal axis that is defined completely within a plane that extends completely through an axis of the wheel shaft. The stump grinding wheel can be powered by a power transmitting means between the wheel member shaft, an idler shaft, and an engine mounted on a turntable assembly. The turntable assembly may be mounted to a frame that is supported by at least one wheel. In one embodiment, the stop includes a generally planar surface that extends generally perpendicular to a longitudinal axis of the elongated shaft.

Other objects of the invention are achieved by a stump grinding wheel having a wheel member rotatably mounted about a wheel member shaft. A plurality of receiving brackets are mounted to the wheel member, each receiving bracket includes a channel and holding means for holding the receiving brackets to the wheel member. A means for cutting a tree stump is received in each respective receiving bracket, the cutting means includes means for gaugably mounting the cutting means to the wheel member.

In one preferred embodiment, the stump cutting means includes a plurality of cutting tools and each cutting tool includes an elongated shaft having a base end and a distal end, and a cutting tip at the distal end. A ledge is defined on the elongated shaft between the base end and the distal end and is configured so that the ledge permits gauging of the distance between each receiving bracket and its respective cutting tip. The cutting tool elongated shaft base end may be slidably received within a respective bracket channel.

Other objects of the present invention are achieved by an independently gaugable cutting tool for use with a receiving bracket having a channel and mounted on a cutting wheel of a stump cutting apparatus. The cutting tool includes an elongated shaft generally correspondingly shaped to the bracket channel and defines a base end and a distal end. The base end defines a generally uniform cross-section for at least a portion thereof to permit slidable receipt of the cutting tool between the receiving bracket and the cutting wheel. A cutting tip is defined at the distal end, and a ledge is defined on the elongated shaft between the base end and the distal end and is configured so that it engages the receiving bracket to permit gauging of the distance between the receiving bracket and the cutting tip.

Still further objects are achieved by a stump cutting apparatus including a frame structure supported by at least one wheel and an engine supported by the frame. A boom is pivotally mounted to the frame and has a proximal end and a distal end. A cutting wheel is rotatably mounted to the distal end of the boom and includes a first side surface and a second side surface. A plurality of receiving brackets are mounted to the cutting wheel first and second side surfaces. Each bracket includes a channel for receipt of a cutting tool and a stop ledge adjacent to the channel. Each cutting tool includes an elongated shaft generally correspondingly shaped to the channel and has a base end and a distal end, and a cutting tip defined at the distal end. Each cutting tool also includes means for independently gauging the distance between each receiving bracket stop ledge and a respective cutting tip defined thereon.

In one preferred embodiment, the cutting tool independent gauging means includes a ledge defined on the elongated shaft between the base end and the distal end and is configured so that the ledge engages the bracket stop ledge.

Other objects, features and aspects of the present invention are discussed in greater detail below. The accompanying drawings are incorporated in and constitute a part of the specification, and illustrate one or more embodiments of the invention. These drawings, together with the description, serve to explain the principles of the invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting of the broader aspects of the present invention, which broader aspects are embodied in the exemplary constructions.

The present invention provides a novel cutting tool that can be inserted directly into a conventional receiving bracket to the correct radial distance without the need for a separate gauging device. The cutting tool of the present invention permits quick and accurate replacement. Additionally, it is lightweight and may even be carried by an operator, for example, in his pants or jacket pockets to facilitate rapid field replacement, ensuring more efficient operation of the stump cutting machine.

Figure 1:
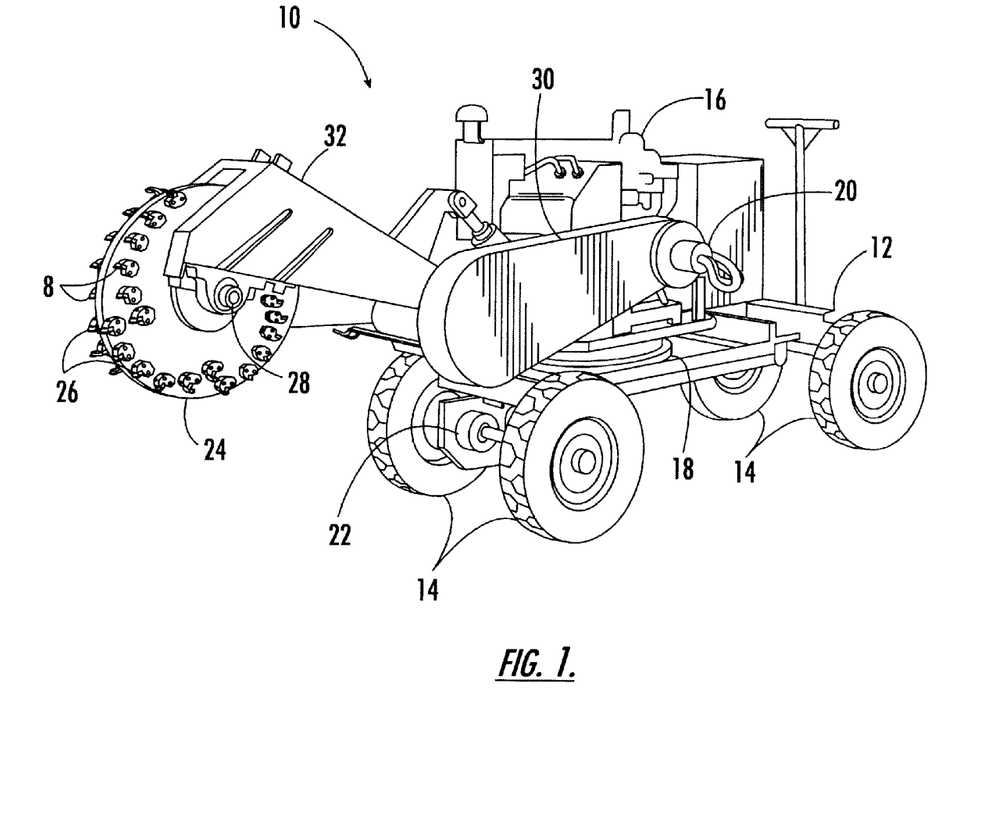
FIG. 1 is a perspective view of a stump grinding machine constructed in accordance with the present invention.

FIG. 1 illustrates a stump grinding machine 10 having improved cutting tools 8 constructed in accordance with an embodiment of the present invention. As shown, machine 10 includes a frame structure 12 supported by a plurality of wheels 14 to facilitate movement of the machine from place to place. An engine 16 may be mounted on a turntable assembly 18 which allows boom 32 to rotate through a predetermined horizontal arc. Boom 32 includes a grinding wheel 24 at its distal end.

In the illustrated embodiment, machine 10 includes a hydraulic pump 20 connected to an output shaft of engine 16 to power various fluid-actuated cylinders and the like. In this case, machine 10 is a self-propelled device driven by a hydraulic motor 22 operatively connected to hydraulic pump 20. It should be distinctly understood, however, that the present invention includes non-self-propelled stump grinding machines as well as stump grinding machines powered by other suitable mechanisms.

Engine 16 supplies power to grinding wheel 24 through a series of belts (not shown). In this case, for example, a first belt stage housed within a cover 30 delivers power from engine 16 to an idler shaft (not shown). Boom 32 pivots in a vertical direction about the idler shaft. A second belt stage delivers power from the idler shaft to a grinding wheel shaft 28. Grinding wheel 24 rotates about grinding wheel shaft 28. It should be understood, however, that various mechanisms exist for powering the stump grinding machine and transmitting the power to grinding wheel 24.

Figure 2:
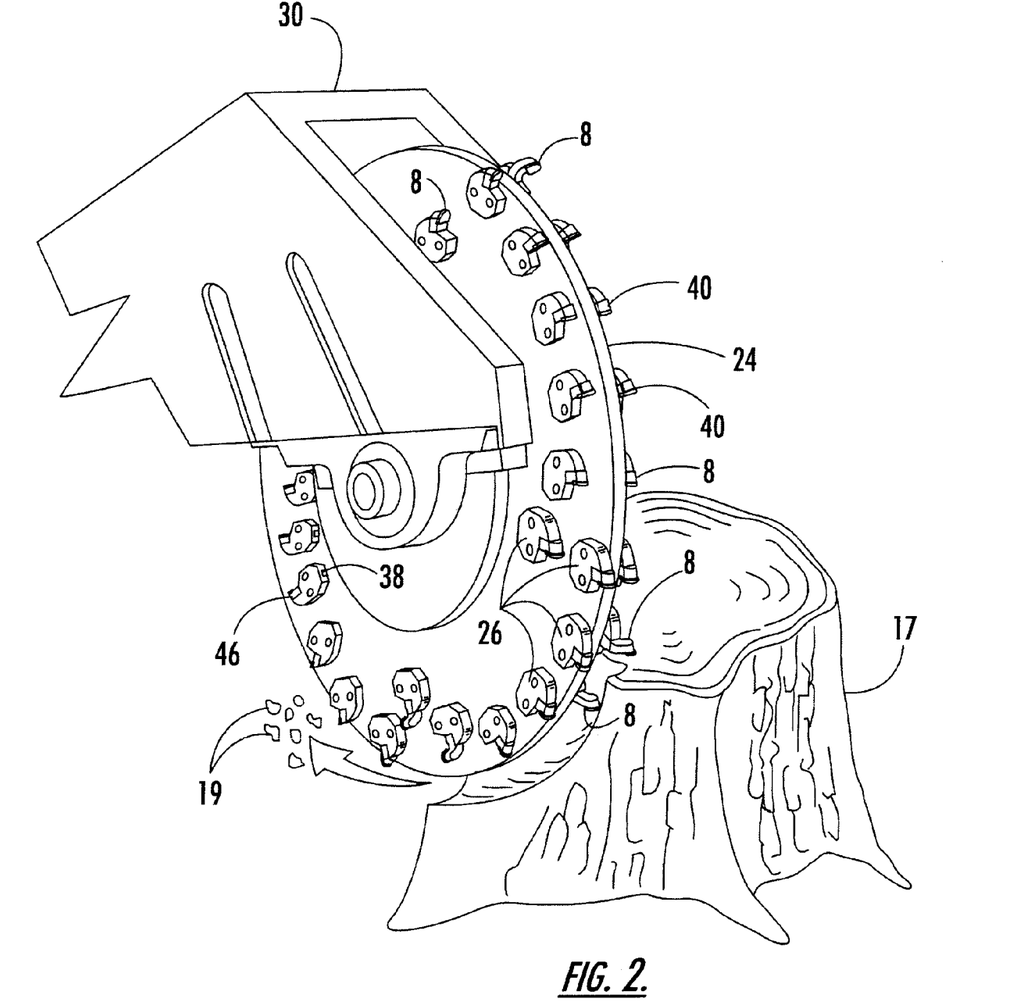
FIG. 2 is a perspective view of the grinding wheel assembly of FIG. 1.

Referring now also to FIG. 2, wheel 24 performs the stump grinding operation. As shown, grinding wheel 24 has a plurality of radially arranged stump cutting tools 8 mounted in respective receiving brackets 26 disposed on each side of the grinding wheel. Cutting tools 8 serve to grind the stump as the rotating grinding wheel moves across it by removing small stump pieces 19.

The various receiving brackets 26 are preferably arranged in a predetermined radial pattern so as to provide a full cut. For example, some of brackets 26 may be located such that cutting tools 8 do not extend to the outer diameter of wheel 24. In other cases, the cutting tip 40 of tool 8 will extend past the wheel's outer diameter. By locating receiving brackets 26 and cutting tools 8 at varying radial distances from grinding wheel shaft 28, the amount of cutting performed by each tool is more evenly distributed from tool to tool, thus extending the life of cutting tools 8 and increasing the cutting efficiency of the machine. Each cutting tip 40, which is preferably of a carbide construction, is mounted on the end of cutting tool 8 so that it extends radially outward of a respective receiving bracket 26.

Figure 3:
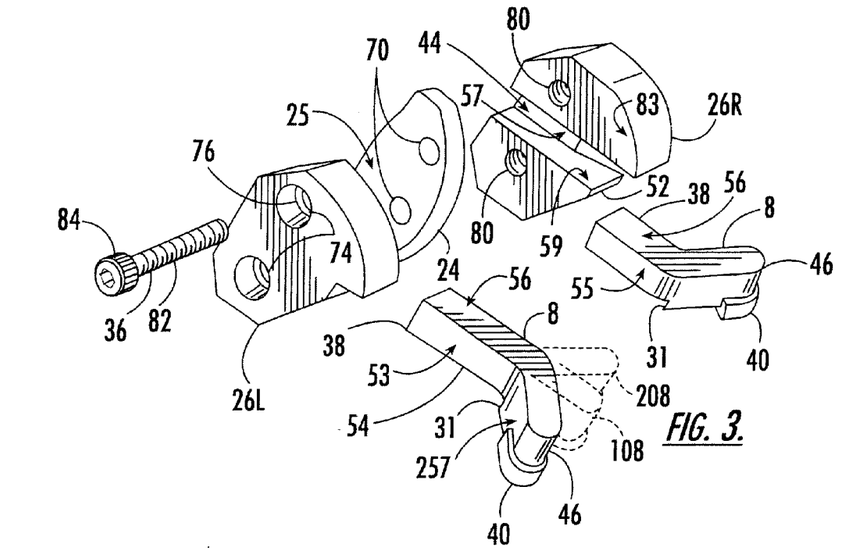
FIG. 3 is an enlarged exploded partial view of the grinding wheel, receiving brackets, and cutting tools used in the grinding wheel assembly of FIGS. 1 and 2.

One method of attaching brackets 26 to cutting wheel 24 is illustrated in FIG. 3. In this case, cutting wheel 24 includes a plurality of apertures 70 defined therethrough. One receiving bracket 26 is disposed on each side of cutting wheel 24 and the brackets are fastened together by at least one bolt 36 extending completely through wheel 24. For example, a left side bracket 26L may define two apertures 74, each of which is countersunk to form a ledge 76 for receipt of a head 84 defined on bolt 36. A right side receiving bracket 26R defines two threaded apertures 80 for receipt of a threaded shaft portion 82 of bolt 36. In this case, receiving bracket pair 26L and 26R are held in place by two bolts 36 that extend through apertures 74, 70, and 80, defined respectively in left side bracket 26L, cutting wheel 24, and right side bracket 26R.

Figure 4:
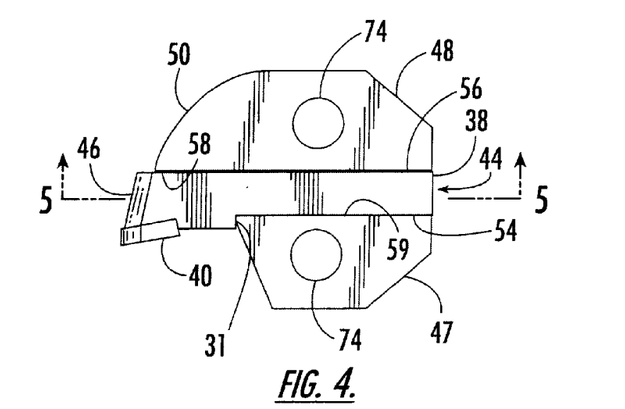
FIG. 4 is an enlarged elevational view of a single receiving bracket and cutting tool.
Figure 5:
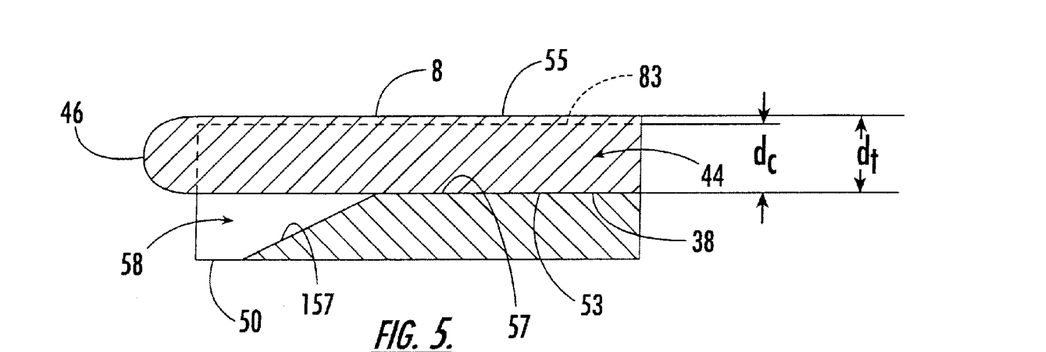
FIG. 5 is a cross-sectional view of a bracket taken along line 5—5 of FIG. 4.

Referring now also to FIGS. 4 and 5, each receiving bracket 26 defines a channel 44 for receipt of a respective cutting tool 8. As shown, each cutting tool 8 includes a base end 38 that is received within a respective channel 44. A distal end 46 extends from the channel so that tip 40 will be exposed for grinding the stump. Each channel 44 defines a depth $d_c$ that is slightly less than the width $d_t$ of cutting tool 8. As a result, bolts 36 can hold brackets 26 and cutting tools 8 to grinding wheel 24 by contact between outer surfaces 25 on the grinding wheel and side surfaces 53 or 55 of cutting tool 8. In one preferred embodiment, the distance $d_t$ is approximately 0.5 inches.

Base end 38 of cutting tool 8 is received within channel 44 of receiving bracket 26 so that the cutting tool base end is closer to cutting wheel shaft 28 (FIG. 2) than is its distal end 46. Channel 44 extends between a leading bracket half 47 and a trailing bracket half 48, which are defined by the relative rotation of cutting wheel 24. In this embodiment, a trailing bracket half 48 includes an extension 50 extending outwardly beyond an outermost stop ledge 52 (FIG. 3) of leading bracket half 47. As discussed in more detail below with reference to FIGS. 7A–9B, cutting tool 8 may be bent to the right as shown by the cutting tool corresponding to left side bracket 26L, or it may be straight 108 or bent to the left 208 (as shown in phantom in FIG. 3).

Cutting tool 8 has a leading surface 54, also defined by the relative rotation of wheel 24, and a trailing surface 56 opposite leading surface 54. Trailing bracket half 48 defines a planar surface 58 which engages trailing surface 56 of cutting tool 8, and a second planar surface 59 that is opposite to surface 58 so as to engage cutting tool leading surface 54. When receiving bracket 26 is clamped to cutting wheel 24, extension 50 provides additional support for trailing surface 56 and cutting tip 40.

As shown most clearly in FIG. 5, each bracket 26 defines a third planar surface 57 between planar surfaces 58 and 59 so that planar surfaces 57, 58, and 59 define channel 44. Each bracket 26 may also include a sloped surface 157 adjacent to surface 57 and between surfaces 58 and 59 to accommodate a bent cutting tool (FIGS. 8A–9B).

Referring again to FIG. 4, each cutting tool 8 defines a corresponding stop or ledge 31 that engages leading bracket half 47 so that the radial position of cutting tip 40 will be fixed when cutting tool 8 is inserted into the bracket.

Figure 6A:
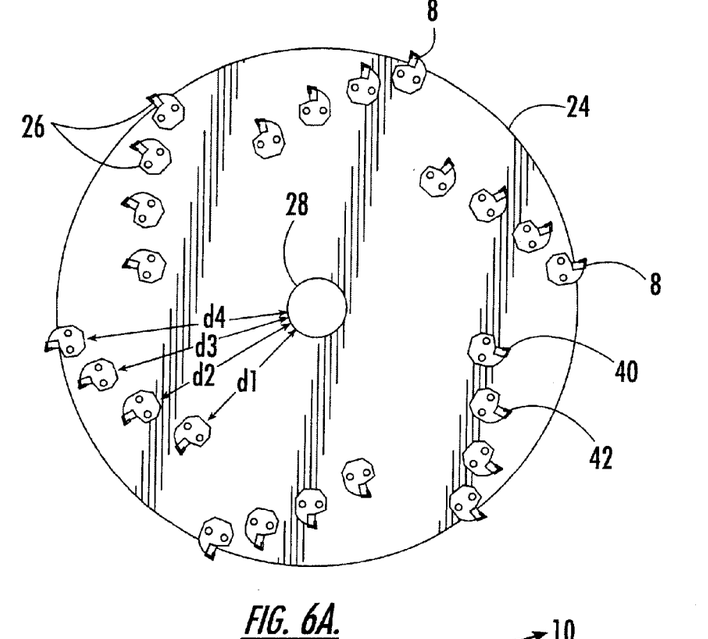
FIGS. 6A and 6B are plan views of cutting wheel assemblies in accordance with embodiments of the present invention.

Referring also to FIG. 6A, an embodiment of grinding wheel 24 with receiving brackets 26 mounted thereon is illustrated. As indicated by the distance measurements d1, d2, d3 and d4, receiving brackets 26 are located at varying radial distances from grinding wheel shaft 28. For example, in the embodiment illustrated in FIG. 6A, six sets of four receiving brackets 26 are employed so that cutting tools 8 are evenly distributed about cutting wheel 24.

Figure 6B:
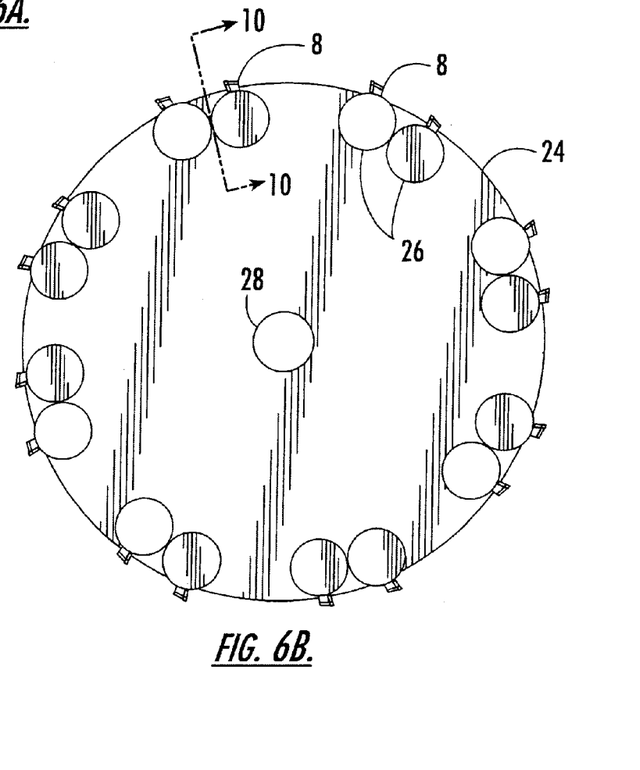

Referring also to FIG. 6B, another embodiment of grinding wheel 24 and receiving brackets 26 is illustrated. In this embodiment, eight sets of two circular type receiving brackets 26 are employed, and the forward most circular receiving bracket 26 is disposed at a greater radial distance from grinding wheel shaft 28 than is its corresponding adjacent receiving bracket 26. It should be understood, however, that varying configurations of receiving brackets 26 on cutting wheels 24 are contemplated by the present invention.

Figure 7A:
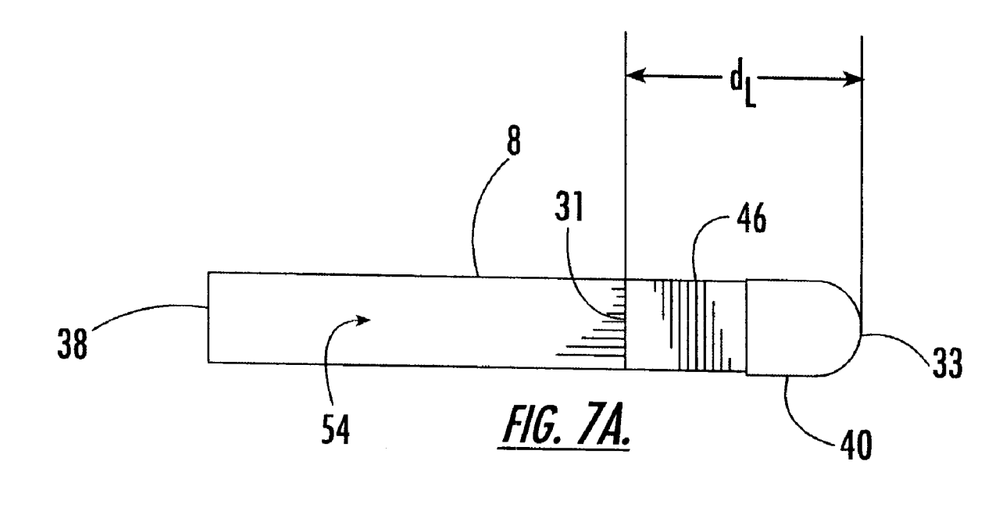
FIGS. 7A, 7B, 8A, 8B, 9A, and 9B are respective plan and side views of cutting tools constructed in accordance with embodiments of the present invention.
Figure 7B:
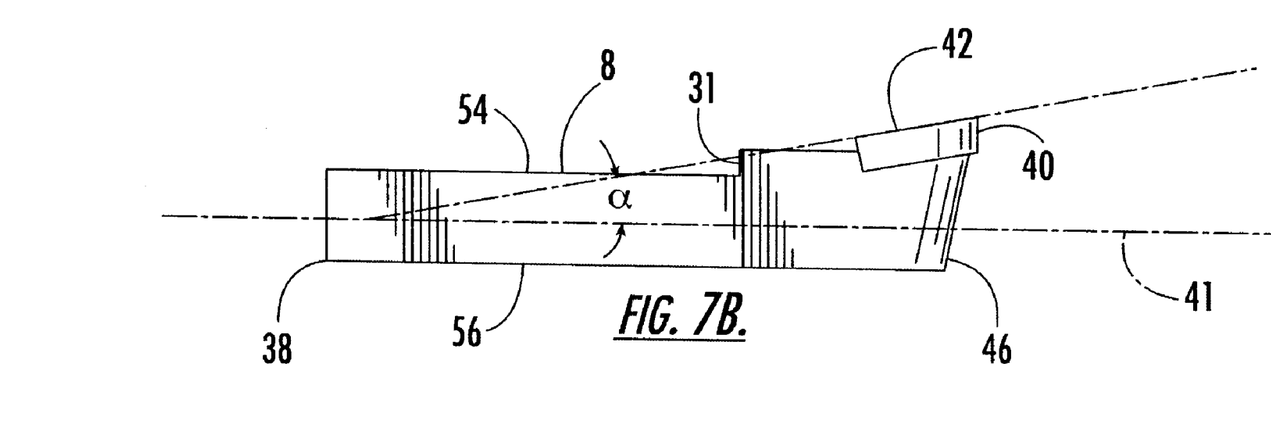

As shown in FIG. 7A, a straight cutting tool 8 includes base end 38 and distal end 46, and a carbide cutting tip 40 brazed onto cutting tool leading surface 54 at distal end 46. Leading surface 54 defines a ledge or stop 31 extending generally perpendicular therefrom. In one preferred embodiment, a distance $d_L$ defined from stop 31 to a far end 33 of carbide cutting tip 40 is approximately 1.313 inches. Referring also to FIG. 7B, cutting tip 40 defines a cutting surface 42 that is angled slightly with respect to a longitudinal axis 41 of cutting tool 8. For example, in one preferred embodiment, cutting surface 42 of cutting tip 40 forms an angle alpha ( ) with respect to longitudinal axis 41 that is approximately nine degrees.

Figure 8A:
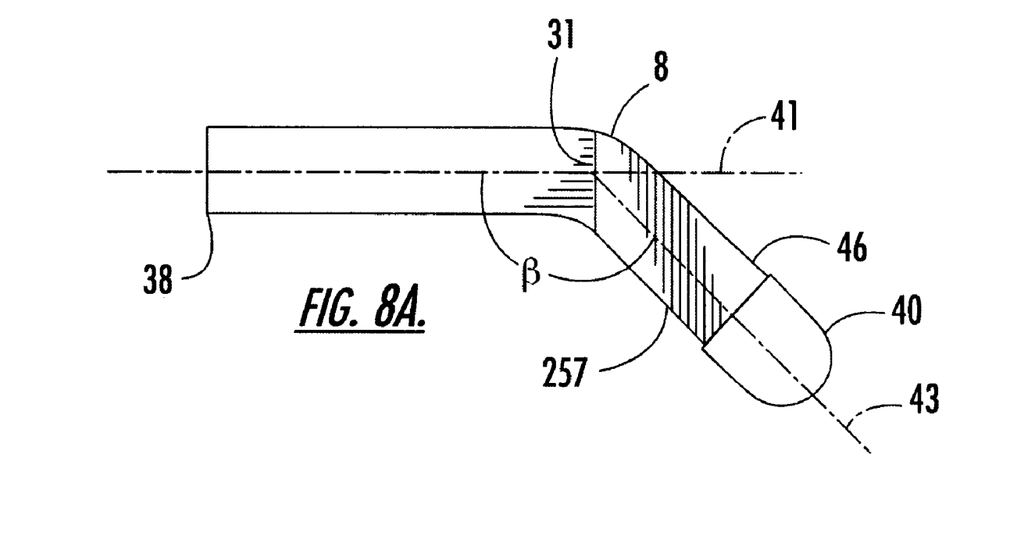
Figure 8B:
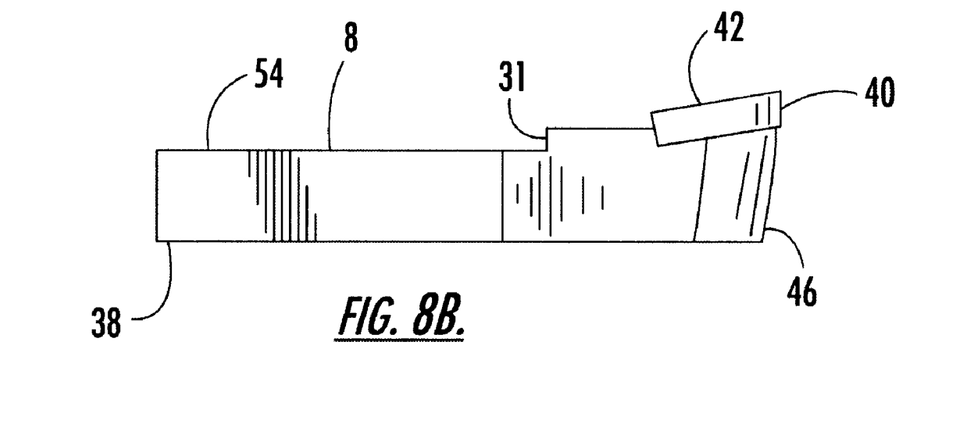

Referring now to FIG. 8A, a cutting tool 8 defining a bend to the right is illustrated. In this embodiment of cutting tool 8, distal end 46 defines a longitudinal axis 43 that forms an angle beta ($\beta$) with respect to longitudinal axis 41 defined through cutting tool base end 38. In one preferred embodiment, beta ($\beta$) is approximately 135 degrees. Each bent cutting tool 8 defines a side surface 257 at its distal end that engages receiving bracket surface 157 (FIG. 5). Preferably, surfaces 157 and 257 are angled with respect to channel 44 and cutting tool base end 38 so that upon receipt of the cutting tool into the channel, surfaces 157 and 257 engage and are parallel to each other. As shown in FIG. 8B, cutting tool 8 defines a ledge 31 in its forward surface 54.

Figure 9A:
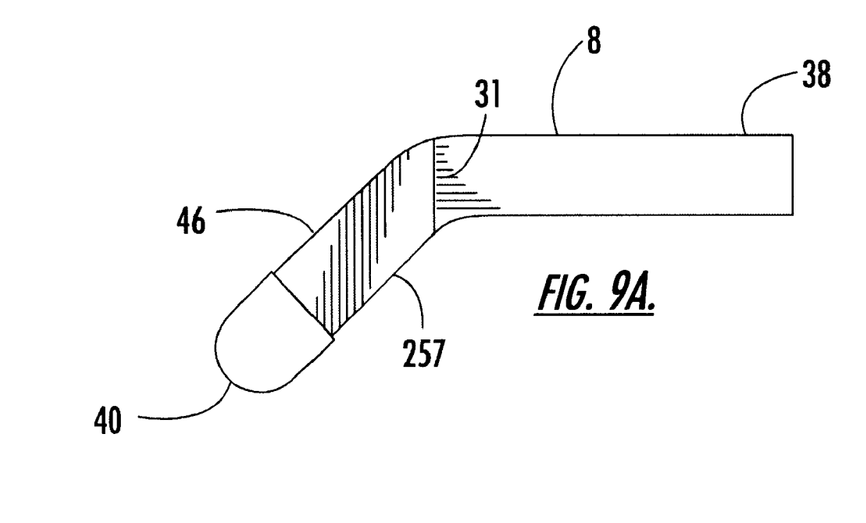
Figure 9B:
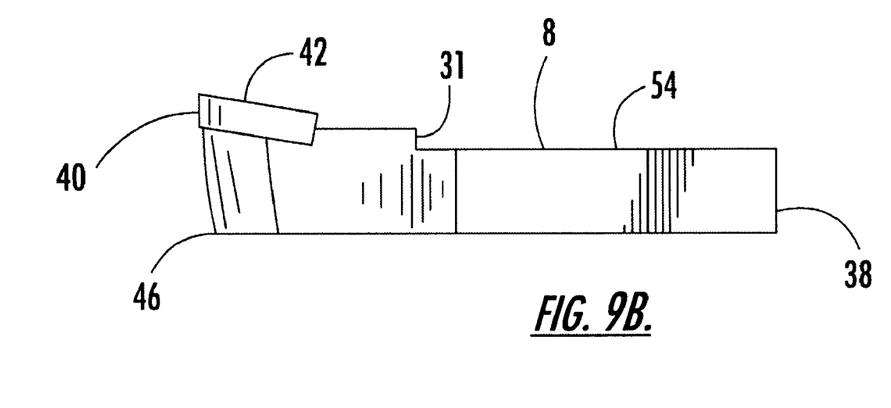

Referring also to FIGS. 9A and 9B, cutting tool 8 defines a distal end 46 that bends to the left with respect to longitudinal-axis 41 defined through base end 38. Although not illustrated in FIG. 9A, the bend to the left also defines an angle beta ($\beta$) with respect to longitudinal axes of base end 38 and distal end 46, and cutting face 42 defines an angle alpha ( ) with respect to longitudinal axis 41 of cutting tool 8.

Figure 10:
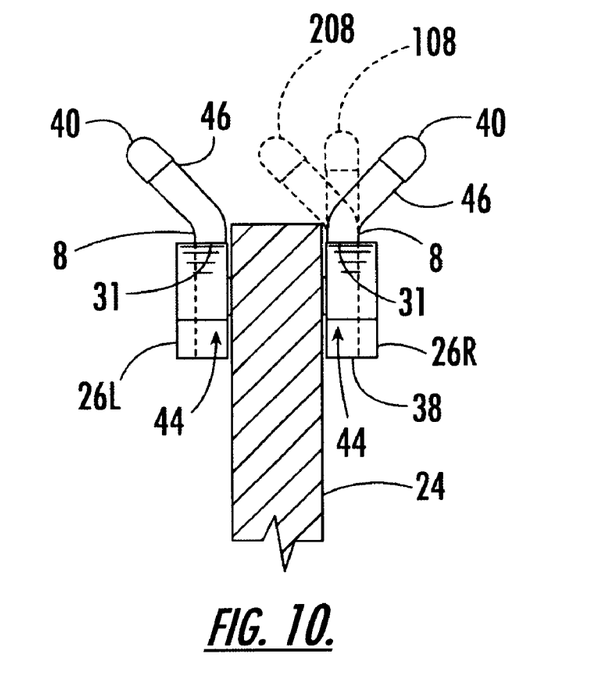
FIG. 10 is a partial cross-sectional view of the cutting wheel assembly of FIG. 6B taken along line 10—10.

FIG. 10 is cross-sectional view of cutting wheel 24 taken along lines 10—10 at FIG. 6B, and showing receiving brackets 26 disposed on each side of the cutting wheel. As illustrated, receiving brackets 26 are referenced as 26R and 26L. Right side receiving bracket 26R illustrates that any one of the cutting tool embodiments illustrated in FIGS. 7A–9B can be utilized within a particular receiving bracket 26.

Figure 11:
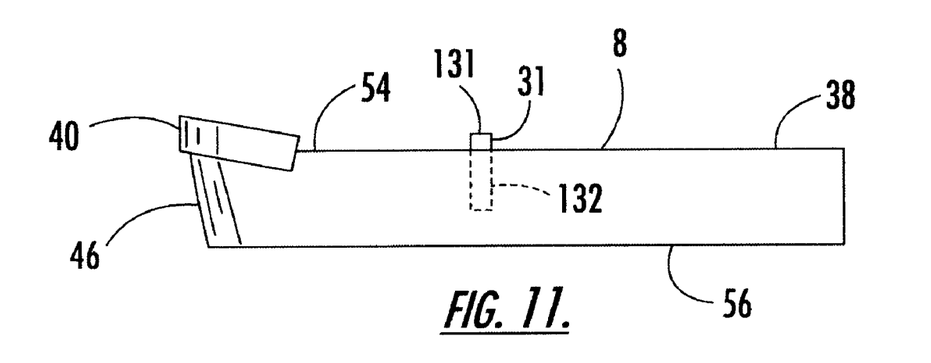
FIG. 11 is a side view of an embodiment of another embodiment of a cutting tool in accordance with the present invention.

FIG. 11 illustrates an embodiment of a cutting tool 8 in accordance with the present invention. As shown, stop 31 is formed on a circular pin 131 that is press fit into a bore 132 defined in cutting tool forward surface 54. In this embodiment, pin 131 replaces stop 31 of FIGS. 7A–9B and will engage stop ledge 52 to automatically gauge the distance of the cutting tip from the receiving bracket.

While preferred embodiments of the invention have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part, and that dimensions and angle measurements can be modified without departing from the scope of the present invention. Furthermore those of ordinary skill in the art will appreciate that the foregoing description is by way of example only, and is not intended as a limitation of the invention so further described in such appended claims.

What is claimed is:

1. A stump grinding wheel comprising:
   a wheel member having a plurality of receiving brackets, each said bracket including a cutting tool channel;
   a cutting tool received in each of said cutting tool channels, said cutting tool including:
      an elongated shaft having a base end and a distal end, said elongated shaft further including a first side surface, a second side surface, a front surface, and a rear surface,
      a cutting tip at said distal end, and
      a stop defined on said elongated shaft between said base end and said distal end and configured so that said stop permits gauging of the distance between each said receiving bracket and said cutting tip, said stop being at least partially defined on said front surface of said elongated shaft.

2. The stump grinding wheel of claim 1, wherein at least a portion of said first side surface is parallel to at least a portion of said second side surface, and wherein at least a portion of said front surface is parallel to at least a portion of said rear surface.

3. The stump grinding wheel of claim 1, wherein said cutting tip includes a carbide cutting tip defined on said front surface of said elongated shaft, and wherein said cutting tip defines a cutting surface that is angled approximately nine degrees with respect to a longitudinal axis of said cutting tool.

4. The stump grinding wheel of claim 1, wherein said elongated shaft defines a bend between said base end and said distal end.

5. The stump grinding wheel of claim 4, wherein said stop is defined between said bend and said distal end.

6. The stump grinding wheel of claim 1, including
   a wheel member shaft that transmits power to said wheel member, said wheel member rotating about a rotational axis of said wheel member shaft, wherein each said receiving bracket and each said cutting tool are configured on said wheel member so that said base ends of said cutting tools are closer to said wheel member shaft than said distal ends, and wherein each said cutting tool defines a longitudinal axis that extends through said wheel member shaft rotational axis.

7. The stump grinding wheel of claim 6, including a frame supported by at least one wheel, a turntable assembly mounted on said frame, an engine mounted on said turntable assembly, an idler shaft, and means for transmitting power from said engine to said idler shaft to said wheel member.

8. The stump grinding wheel of claim 1, wherein said stop includes a generally planar surface that extends generally perpendicular to a longitudinal axis of said elongated shaft.

9. A stump grinding wheel comprising:
   a wheel member rotatably mounted about a wheel member shaft;
   a plurality of receiving brackets mounted to said wheel member, each said receiving bracket including a channel and holding means for holding said receiving brackets to said wheel member;
   a plurality of cutting tools, each said cutting tool including
      an elongated shaft having a base end and a distal end which is slidably received within a respective said channel,
      a cutting tip at said distal end, and
      a gauging ledge defined on a front surface of said elongated shaft between said base end and said distal end and configured so that said gauging ledge permits gauging of the distance between each said receiving bracket and said cutting tip.

10. A stump grinding wheel as set forth in claim 9, wherein each of said brackets is configured such that said channel is defined between a leading bracket half and a trailing bracket half, said trailing bracket half including an extension extending outwardly beyond a stop ledge of said leading bracket half, said gauging ledge engaging said stop ledge of said leading bracket half when said elongated shaft of said cutting tool is inserted into said channel.

11. An independently gaugable cutting tool for use with a receiving bracket having a channel and mounted on a cutting wheel of a stump cutting apparatus, said cutting tool comprising:
    an elongated shaft generally correspondingly shaped to the channel and having a base end and a distal end, said base end defining a generally uniform cross-section for at least a portion thereof to permit slidable receipt of said cutting tool between the receiving bracket and the cutting wheel;
    a cutting tip at said distal end, and
    a ledge defined on a front surface of said elongated shaft between said base end and said distal end and configured so that said ledge engages the receiving bracket to permit gauging of the distance between the receiving bracket and said cutting tip.

12. A bracket/cutting tool combination comprising:
    a receiving bracket including a channel defined between a leading bracket half and a trailing bracket half, said trailing bracket half including an extension extending outwardly beyond an outermost stop ledge of said leading bracket half;
    a cutting tool including an elongated shaft and a cutting tip, said shaft being inserted into said channel of said bracket; and
    gauging means located on a front surface of said elongated shaft for engaging said stop ledge of said leading bracket half and thereby gauging the distance between stop ledge of said leading bracket half and said cutting tip.

13. The combination as set forth in claim 12, wherein said gauging means comprises a gauging ledge defined on said front surface of said elongated shaft.

14. The combination as set forth in claim 13, wherein said gauging means comprises a pin located on said front surface of said elongated shaft.

15. The combination as set forth in claim 14, wherein said pin is press fit into said shaft.

16. The combination as set forth in claim 12, wherein said elongated shaft has a rectangular cross section.

17. The combination of a cutting tool and a bracket for clamping the cutting tool, said combination comprising:
    a receiving bracket including a channel defined between a leading bracket half and a trailing bracket half;
    a cutting tool including an elongated shaft and a cutting tip, said shaft being inserted into said channel of said bracket; and
    a pin located on said elongated shaft for engaging a stop ledge of said bracket and thereby gauging the distance between stop ledge and said cutting tip.

* * * * *